US008712559B2

(12) United States Patent
Cao et al.

(10) Patent No.: US 8,712,559 B2
(45) Date of Patent: Apr. 29, 2014

(54) ADAPTIVE CONTROL FOR UNCERTAIN NONLINEAR MULTI-INPUT MULTI-OUTPUT SYSTEMS

(75) Inventors: Chengyu Cao, Shrewsbury, MA (US); Naira Hovakimyan, Champaign, IL (US); Enric Xargay, Urbana, IL (US)

(73) Assignees: The Board of Trustees of the University of Illionois, Urbana, IL (US); University of Connecticut, Farmington, CT (US)

( * ) Notice: Subject to any disclaimer, the term of this patent is extended or adjusted under 35 U.S.C. 154(b) by 571 days.

(21) Appl. No.: 13/023,965

(22) Filed: Feb. 9, 2011

(65) Prior Publication Data

US 2011/0196514 A1  Aug. 11, 2011

Related U.S. Application Data

(60) Provisional application No. 61/303,182, filed on Feb. 10, 2010.

(51) Int. Cl.
*G06F 19/00* (2011.01)

(52) U.S. Cl.
USPC .............................. 700/48; 700/52

(58) Field of Classification Search
USPC .......... 700/50, 51, 48, 31, 28, 20; 706/15, 48, 706/31; 708/304
See application file for complete search history.

(56) References Cited

U.S. PATENT DOCUMENTS

| 3,832,580 A | 8/1974 | Yamamuro |
| 4,384,394 A | 5/1983 | Lemonon et al. |
| 4,401,911 A | 8/1983 | Ravinet et al. |
| 4,518,555 A | 5/1985 | Ravinet |
| 5,229,979 A | 7/1993 | Scheinbeim |
| 5,250,784 A | 10/1993 | Muller |
| 5,268,034 A * | 12/1993 | Vukelic ......................... 118/719 |
| 5,356,500 A | 10/1994 | Scheinbeim et al. |
| 5,430,565 A | 7/1995 | Yamanouchi |
| 5,440,194 A | 8/1995 | Beurrier |
| 5,642,015 A | 6/1997 | Whitehead et al. |
| 5,796,920 A | 8/1998 | Hyland |
| 5,835,453 A | 11/1998 | Wynne et al. |
| 5,902,836 A | 5/1999 | Bennett et al. |
| 5,915,377 A | 6/1999 | Coffee |
| 5,977,685 A | 11/1999 | Kurita et al. |

(Continued)

FOREIGN PATENT DOCUMENTS

| TW | 242700 B | 11/2005 |
| WO | 2005015324 A2 | 2/2005 |

OTHER PUBLICATIONS

Hu et al., neural Networks Robust Adaptive control for a class of MIMO uncertain Noninear Sytem, 2005, Tsinghua Universty, p. 60-68.*

(Continued)

*Primary Examiner* — Kidest Bahta
(74) *Attorney, Agent, or Firm* — Quarles & Brady, LLP

(57) ABSTRACT

Systems and methods of adaptive control for uncertain nonlinear multi-input multi-output systems in the presence of significant unmatched uncertainty with assured performance are provided. The need for gain-scheduling is eliminated through the use of bandwidth-limited (low-pass) filtering in the control channel, which appropriately attenuates the high frequencies typically appearing in fast adaptation situations and preserves the robustness margins in the presence of fast adaptation.

19 Claims, 8 Drawing Sheets

(56) References Cited

U.S. PATENT DOCUMENTS

| | | | |
|---|---|---|---|
| 6,048,622 | A | 4/2000 | Hagood, IV et al. |
| 6,060,811 | A | 5/2000 | Fox et al. |
| 6,084,321 | A | 7/2000 | Hunter et al. |
| 6,184,608 | B1 | 2/2001 | Cabuz et al. |
| 6,184,609 | B1 | 2/2001 | Johansson et al. |
| 6,249,076 | B1 | 6/2001 | Madden et al. |
| 6,618,631 | B1 | 9/2003 | Johnson et al. |
| 6,904,422 | B2 * | 6/2005 | Calise et al. ............. 706/23 |
| 7,277,764 | B2 | 10/2007 | Hovakimyan et al. |
| 7,415,331 | B2 * | 8/2008 | Dapp et al. ............. 701/25 |
| 7,418,432 | B2 * | 8/2008 | Calise et al. ............. 706/23 |
| 7,593,793 | B2 | 9/2009 | Lavretsky et al. |
| 2004/0015933 | A1 * | 1/2004 | Campos et al. ............. 717/160 |
| 2004/0138797 | A1 | 7/2004 | Yao et al. |
| 2005/0137724 | A1 | 6/2005 | Hovakimyan et al. |
| 2006/0027710 | A1 | 2/2006 | Lavretsky et al. |
| 2006/0129250 | A1 * | 6/2006 | Yasui et al. ............. 700/19 |
| 2006/0217819 | A1 | 9/2006 | Cao et al. |

OTHER PUBLICATIONS

Li et al., Neural-network-base simple adaptive control of uncertain MIMO non-linear sytem, May 2009, Navigation College, p. 1543-1557.*

Yoon et al., adaptive control of uncretain Hamilitonian MIMO Sytem with Applivantion to Spacecraft Control, 2009, IEEE Transaction on control system Technology, p. 1-7.*

U.S. Appl. No. 11/387,067, Office Action mailed Jan. 27, 2009, pp. 1-13.

C. Cao, N. Hovakimyan, "Stability Margins of L1 Adaptive Control Architecture," IEEE Transactions on Automatic Control, 55(2): pp. 480-487, Feb. 2010.

V. Patel, C. Cao, N. Hovakimyan, K. Wise, E. Lavretsky, "Adaptive Controller for Tailless Unstable Aircraft in the Presence of Unknown Actuator Failures," International Journal of Control, 82(4): pp, 705-720, Apr. 2009.

C. Cao, N. Hovakimyan, "Adaptive Controller for Systems with Unknown Time-varying Parameters and Disturbances in the Presence of Non-Zero Trajectory Initialization Error," International Journal of Control, 81(7): pp. 1147-1161, 2008.

C. Cao, N. Hovakimyan, "Adaptive Output Feedback Controller for Systems of Unknown Dimension," IEEE Transactions on Automatic Control, 53(3): pp. 815-821, Apr. 2008.

C. Cao, N. Hovakimyan, "Design and Analysis of a Novel Adaptive Control Architecture with Guaranteed Transient Performance," IEEE Transactions on Automatic Control, 53(2): pp. 586-591, Mar. 2008.

J. Wang, V. Patel, C. Cao, N. Hovakimyan, E. Lavretsky, Novel Adaptive Control Methodology for Aerial Refueling with Guaranteed Transient Performance, AIAA Journal of Guidance, Control and Dynamics, 31(1): pp. 182-193, Jan.-Feb. 2008.

Jean-Baptiste Pomet and Laurent Praly. "Adaptive nonlinear regulation: Estimation from the Lyapunov equation," IEEE Transactions on Automatic Control, 37(6):729-740, Jun. 1992.

Aditya Paranjape, Enric Xargay, Naira Hovakimyan, and Chengyu Cao. "Guaranteed transient performance with L1 adaptive controller for nonlinear strict-feedback systems," In Mediterranean Conference on Control and Automation, Thessaloniki, Greece. Jun. 2009, pp. 229-234.

Brian D. O. Anderson, "Failures of adaptive control theory and their resolution." Communications in Information and Systems, 5(1): pp. 1-20, 2005.

Chengyu Cao and Naira Hovakimyan. "L1 Adaptive Output-Feedback Controller for Non-Strictly-Positive-Real Reference Systems: Missile Longitudinal Autopilot Design," AIAA Journal of Guidance, Control, and Dynamics, 32(3): pp. 717-726, May-Jun. 2009.

Irene M. Gregory, Chengyu Cao, Enric Xargay, Naira Hovakimyan, and Xiaotian Zou. "L1 Adaptive Control Design for NASA AirSTAR Flight Test Vehicle," American Institute of Aeronautics and Astronautics, In AIAA Guidance, Navigation, and Control Conference, Chicago, IL. Aug. 2009, pp. 1-27.

Tyler Leman, Enric Xargay, Geir Dullerud, and Naira Hovakimyan. "L1 Adaptive Control Augmentation System for the X-48B Aircraft," American Institute of Aeronautics and Astronautics, In AIAA Guidance, Navigation, and Control Conference, Chicago, IL. Aug. 2009, pp, 1-14.

Chengyu Cao and Naira Hovakimyan. "Guaranteed Transient Performance with L1 Adaptive Controller for Systems with Unknown Time-Varying Parameters and Bounded Disturbances: Part 1," Proceedings of the 2007 American Control Conference, New York, NY. Jul. 2007, pp. 3925-3930.

Chengyu Cao and Naira Hovakimyan. "L1 Adaptive Control Theory: Guaranteed Robustness with Fast Adaptation," Published by the Society for Industrial and Applied Mathematics, 2010. pp. 1-71.

* cited by examiner

ADAPTIVE CONTROL FOR UNCERTAIN NONLINEAR MULTI-INPUT MULTI-OUTPUT SYSTEMS

CROSS-REFERENCE TO RELATED APPLICATIONS

This application claims the benefit of U.S. Provisional Patent Application No. 61/303,182, filed Feb. 10, 2010, and entitled "Adaptive Control For Uncertain Nonlinear Multi-Input/Multi-Output Systems," which is hereby incorporated by reference.

STATEMENT CONCERNING FEDERALLY SPONSORED RESEARCH OR DEVELOPMENT

This invention was made with government support under NNX08ABA65A awarded by NASA. The government has certain rights in the invention.

BACKGROUND OF THE INVENTION

The present invention relates generally to adaptive controls, and more particularly to adaptive controls for uncertain nonlinear multi-input multi-output systems.

Aircraft autopilots have slow adaptive capabilities. To function in quickly changing environments, they resort to gain-scheduling of the controller parameters. A gain-scheduled autopilot is obtained by designing a set of controllers at different operating points and then linearly interpolating controller values between them. Extensive gain-scheduling may be a very expensive and time-consuming procedure. Traditional gain-scheduled autopilots react slowly to changes in conditions and can't compensate for significant changes in aircraft dynamics like sudden, unexpected, severe control surface failures or serious vehicle damage (e.g., having a wing sheared off).

The history of adaptive control is rich with methods for controlling systems in the presence of uncertainties. The development of these methods followed from the certainty equivalence principle. Assuming that the ideal parameters are known, conventional model reference adaptive control (MRAC) uses the nominal controller, parameterized in ideal parameters, to define the desired reference system based on perfect cancellation of uncertainties. Since the parameters are unknown, the adaptive controller is defined using the estimation of the unknown parameters from a gradient minimization scheme. Thus, one needs the estimation to be fast for better convergence, while on the other hand, increasing the speed of adaptation renders the adaptive controller high-gain and reduces the robustness of the closed-loop system to unmodeled dynamics, time-delays, etc. A common sense was that adaptive control is limited to slowly varying uncertainties, but the trade-off between the rate of variation of uncertainties and the performance was not quantified. Despite the stability guarantees, the practical implementation of adaptive controllers remained to be a challenge due to the lack of understanding how to tradeoff between adaptation, performance, and robustness. Because of these limitations, all successful implementations of adaptive controllers in use today are gain-scheduled, thus defeating the main point of adaptation.

Compared to the previous systems and methods of adaptive control, what is needed is an adaptive control that includes assured robustness in the presence of fast adaptation, thereby eliminating the need for gain-scheduling of the adaptive controller.

SUMMARY OF THE INVENTION

The present invention overcomes the aforementioned drawbacks by providing systems and methods that yield an improved $\mathcal{L}_1$ adaptive control architecture that allows for fast adaptive control and assured performance under quickly changing conditions, thereby eliminating the need for gain-scheduling of the adaptive controller. The need for gain-scheduling can be eliminated through the use of bandwidth-limited (low-pass) filtering in the control channel, which appropriately attenuates the high frequencies typically appearing in fast adaptation situations.

Mathematical equations and modeling show that the $\mathcal{L}_1$ adaptive control architecture can be applied to general nonlinear multi-input multi-output (MIMO) systems with significant unmatched uncertainties. The control system can be quickly and easily transferable to new systems, e.g., aircraft, regardless of differences in body structure or maximum ability, which provides for a significantly decreased design and creation phases for new systems. Additional applications for the novel $\mathcal{L}_1$ adaptive control architecture include, but are not limited to, ascent and attitude control for launch vehicles, satellite guidance and attitude control, flight control systems for both manned and unmanned aircraft, missile guidance systems, pressure control system for oil drilling, control of nuclear plants, automatic control of advanced medical devices, control of hysteresis in smart materials, control of power grids, and control of solution propagation along optical fibers.

In accordance with one aspect of the invention, a method of adaptive control for an uncertain nonlinear multi-input multi-output system is provided. The method comprises providing a processor operable to execute a control law residing in a memory. The control law includes a bandwidth-limited filter configuration, and is configured to generate a control signal $u_c$ as an output of the bandwidth-limited filter configuration. The method further includes measuring a system state signal x, generating a prediction of the system state $\hat{x}$, subtracting the prediction of the system state $\hat{x}$ from the measured system state signal x, and producing an error signal $\tilde{x}$; Estimates of uncertainties in the multi-input multi-output system are generated, and the control signal $u_c$ is generated as an output of the bandwidth-limited filter configuration based on the generated estimates of uncertainties and the measured system state x.

In another aspect of the invention, an adaptive control system for controlling a nonlinear multi-input multi-output system with uncertainties is provided. The adaptive control system comprises a fast estimation scheme, with the fast estimation scheme including a state predictor and an adaptive law. The fast estimation scheme is configured to generate estimates of the uncertainties in the multi-input multi-output system. A control law is included with the control law including a bandwidth-limited filter configuration. The control law is configured to generate a control signal $u_c$ as an output of the bandwidth-limited filter configuration.

In yet another aspect of the invention, an adaptive control system is provided that comprises a processor operable to execute a control law residing in a memory, the control law including a bandwidth-limited filter configuration, the control law configured to generate a control signal $u_c$ as an output of the bandwidth-limited filter configuration. A state predictor is configured to generate a prediction of a nonlinear multi-input multi-output system state $\hat{x}$, such that when the system state $\hat{x}$ is subtracted from an actual system state x, an error signal is produced that, together with the actual system state x and the control signal $u_c$, drives an adaptation process.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION

Figure 1:
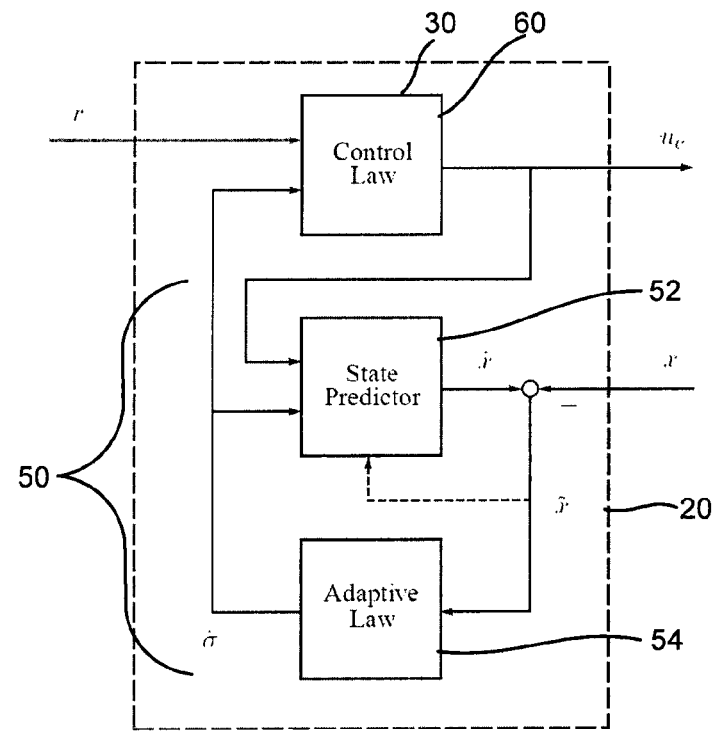
FIGS. 1 and 2 illustrate examples of an adaptive controller according to embodiments of the invention.

Referring now to the drawings wherein like reference numbers correspond to similar components throughout the several views, embodiments of the invention shall be described in the context of a multi-input multi-output state-feedback robust $\mathcal{L}_1$ adaptive controller that automatically adjusts certain parameters and/or signals in the control loops to achieve desired performance specifications, both in transient and steady-state, in the presence of admissible model uncertainties, disturbances, and noises. In particular, the $\mathcal{L}_1$ adaptive controller estimates part of these uncertainties and compensates for their undesirable effects at the output of the plant, while (similar to conventional Robust Control) the $\mathcal{L}_1$ adaptive controller is able to assure stability and a desired level of performance for the uncertainties that adaptation is not able to capture and adapt to.

Figure 2:
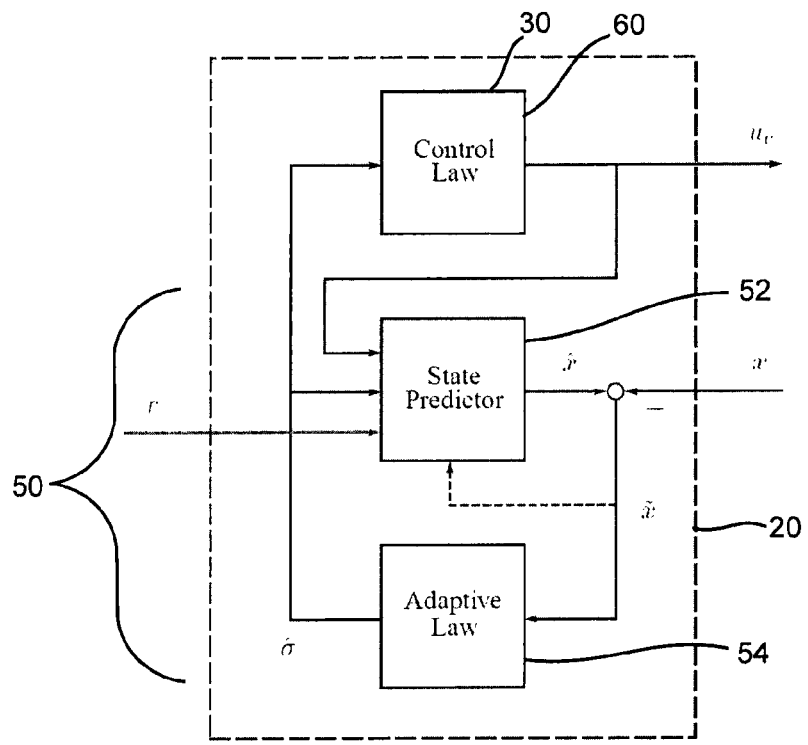

FIG. 1 shows an embodiment of the $\mathcal{L}_1$ adaptive controller 20 in a standalone mode, and FIG. 2 shows an embodiment of the $\mathcal{L}_1$ adaptive controller 20 in an augmentation mode. Since analysis and synthesis of these feedback systems make explicit use of $\mathcal{L}_1$ induced-norms of different signal mappings, the adaptive architectures described herein will be referred to as $\mathcal{L}_1$ adaptive controllers.

Benefits of the $\mathcal{L}_1$ adaptive controller 20 include its fast and robust adaptation which, unlike conventional adaptive control such as MRAC and Self-Tuning Regulators (STR), does not interact with the trade-off between performance and robustness. The separation (decoupling) of fast adaptation from robustness is achieved by appropriately inserting into the control structure a bandwidth-limited filter 30, which ensures that the control signal stays in the desired frequency range and within the bandwidth of the control channel.

The insertion of this bandwidth-limited filter configuration 30 enables the use of estimation schemes with arbitrarily high adaptation rates, which are only subject to hardware limitations, without resulting in high-gain feedback control. In this context, high adaptation rates generally mean rates that lead to a time scale of the adaptation process that is substantially faster than the time scales associated with plant variations and underlying closed-loop dynamics. In this sense, high adaptation rates allow for compensation of the undesirable effects of rapidly varying uncertainties and significant changes in system dynamics. High adaptation rates are also important to achieve assured transient performance for a system's input and output signals, without resorting to gain-scheduling of the control parameters, persistency of excitation, or control reconfiguration. Moreover, the bandwidth-limited filter keeps the robustness margins, for example, the time-delay margin, bounded away from zero in the presence of these arbitrarily fast estimation schemes. To this extent, the bandwidth and structure of the bandwidth-limited filter configuration 30 defines the trade-off between performance and robustness.

The $\mathcal{L}_1$ adaptive controller 20 described herein has the ability to compensate for the effect of general unmatched uncertainties that cannot be addressed by recursive design methods developed for strict-feedback systems, semi-strict-feedback systems, pure-feedback systems, and block-strict-feedback systems. This implies that, to some extent, in the design of the controller, the desired dynamics can be selected without enforcing matching conditions.

The next sections present a detailed description of different elements that integrate the $\mathcal{L}_1$ adaptive control architecture, and explain how these elements can be designed and combined to achieve stability, robustness, and improved performance. In particular, a desired position in the control structure will be described where the bandwidth-limited filter may be inserted in order to benefit from the properties mentioned above.

Control Architecture

Embodiments of the $\mathcal{L}_1$ adaptive controller 20 systems and methods include a fast estimation scheme (FES) 50 and a control law (CL) 60. The FES 50 includes a state-predictor 52 and appropriately designed adaptive laws 54, and is used to generate estimates of the uncertainties present in the plant 70 (see FIGS. 3 and 4) based on the measured state signal x and the control signal $u_c$. The state-predictor 52, which is designed to mimic the actual plant structure and to specify the desired behavior of the closed-loop system, generates a prediction of the system state $\hat{x}$. This prediction, when subtracted from the actual system state x, yields an error signal $\tilde{x}$ that, together with the measured state signal x and the control signal $u_c$, drives the adaptation process. The adaptive laws 54 update the estimates of the uncertainties present in the plant 62 at a high adaptation rate. The FES 50 may also include one or more optional elements to introduce damping in the adaptation loop. Then, based on the estimates of the uncertainties and also the measured state signal x, the CL 60 generates the control signal $u_c$ as the output of the bandwidth-limited filter configuration 30. As described earlier, this filtering process ensures that the control signal $u_c$ has limited frequency content within the bandwidth of the control channel and leads to separation between adaptation and robustness.

Figure 3:
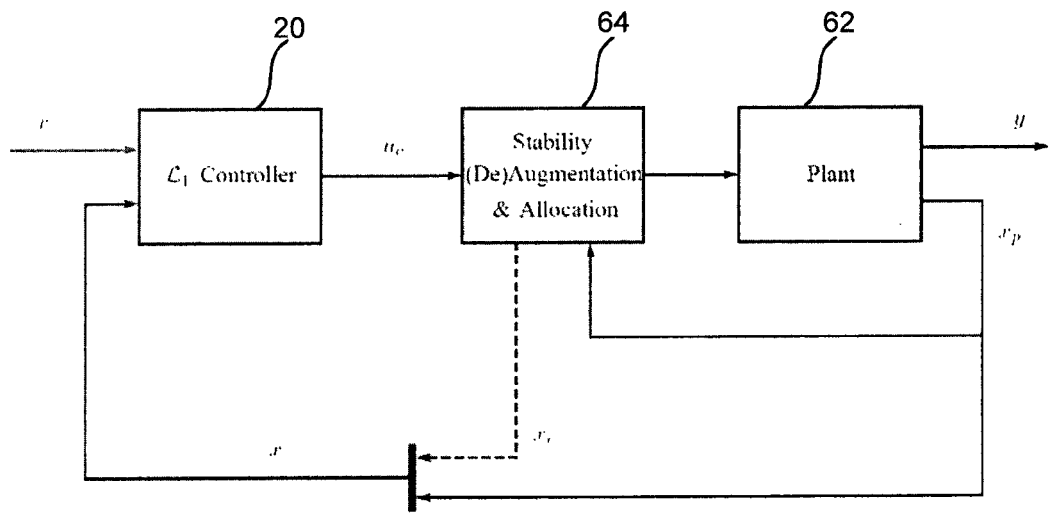
FIG. 3 illustrates an exemplary configuration of the adaptive controller shown in FIG. 1 in a standalone mode.
Figure 4:
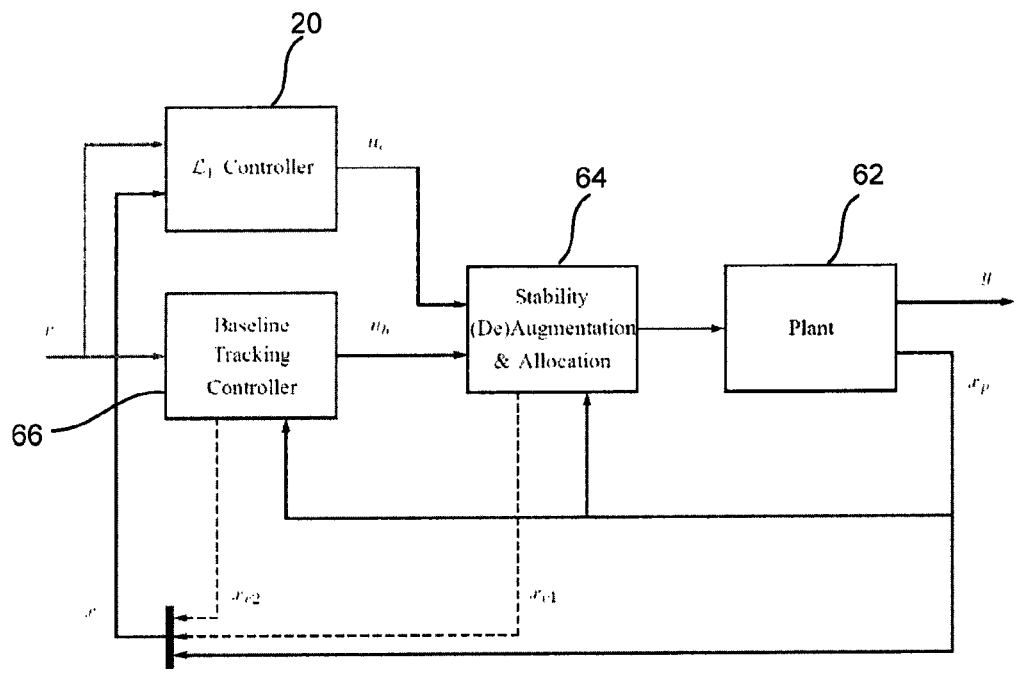
FIG. 4 illustrates an exemplary configuration of the adaptive controller shown in FIG. 2 in an augmentation mode.

The internal structure of both the FES 50 and the CL 60 may depend on whether the $\mathcal{L}_1$ adaptive controller is used in standalone mode or as an augmentation of a baseline tracking controller. The architecture structure of the $\mathcal{L}_1$ adaptive controller in one embodiment of a standalone mode is shown in FIG. 1, while an embodiment of an implementation as an augmentation control system is illustrated in FIG. 2. FIG. 3 shows an overall control structure with the $\mathcal{L}_1$ adaptive controller in a standalone mode. As can be seen, the control structure includes the plant 62 and the stability (de)augmentation and allocation function 64. FIG. 4 shows an overall control structure with the $\mathcal{L}_1$ adaptive controller in an augmentation mode. Similarly, the control structure includes the plant 62 and the stability (de)augmentation and allocation function 64, and also includes the baseline tracking controller 66.

Moreover, to illustrate that the choice of the FES 50 is not unique, equations are provided for both standalone and augmentation modes of two different FES, one based on piecewise constant adaptive laws, and another one using projection-based adaptive laws.

To streamline the subsequent description, definitions are introduced. In what follows, control architectures are considered with n system states available for feedback, m($\leq$n) system outputs subject to performance specifications, and m control signals. The following notations will also be used:

$A_m$: ($\in \mathbb{R}^{n \times n}$) known Hurwitz matrix defining the desired dynamics for the closed-loop system.

$B_m$: ($\in \mathbb{R}^{n \times m}$) known control matrix (obtained, for example, from linearization about a given operation condition).

C: ($\in \mathbb{R}^{m \times n}$) known output matrix.

x(t): ($\in \mathbb{R}^n$) system state (measured). It consists of plant states, $x_p(t)$, and/or baseline controller states, $x_c(t)$.

y(t): ($\in \mathbb{R}^m$) system output (measured). Linear combination of the states of the system subject to performance specifications, y(t)=Cx(t).

r(t): ($\in \mathbb{R}^m$) bounded setpoint.

$u_c(t)$: ($\in \mathbb{R}^m$) adaptive control signal.

$\hat{x}(t)$: ($\in \mathbb{R}^n$) state-predictor state.

$\tilde{x}(t)$: ($\in \mathbb{R}^n$) error signal between system state and state-predictor state, $\tilde{x}(t)=\hat{x}(t)-x(t)$.

$B_{um}$: ($\in \mathbb{R}^{n \times (n-m)}$) constant matrix such that $B_m^T B_{um}=0$ and also rank ($[B_m B_{um}]$)=n.

B: ($\in \mathbb{R}^{n \times n}$) constant matrix defined as $B=[B_m B_{um}]$.

$H_m(s)$: ($\in \mathcal{RH}_\infty$) m$\times$m matched transfer matrix, $H_m(s)=C(s\mathbb{I}_n-A_m)^{-1}B_m$. It is assumed that the transmission zeros of $H_m(s)$ lie in the open left-half plane.

$H_{um}(s)$: ($\in \mathcal{RH}_\infty$) m$\times$(n-m) unmatched transfer matrix $H_{um}(s)=C(s\mathbb{I}_n-A_m)^{-1}B_{um}$.

A. Standalone "All-Adaptive" Mode

1) Piecewise Constant Adaptive Laws ($\mathcal{L}_1$S1).

Figure 5A:
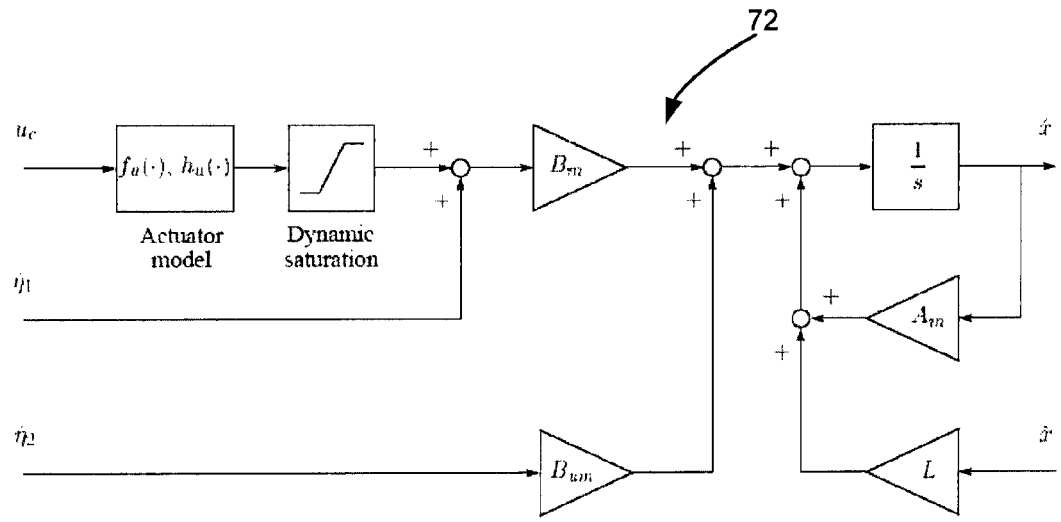
FIGS. 5A, 5B, and 5C show internal structure of the adaptive controller shown in FIG. 1 when used in a standalone mode and with a fast estimation scheme based on piecewise constant adaptive laws.
Figure 5B:
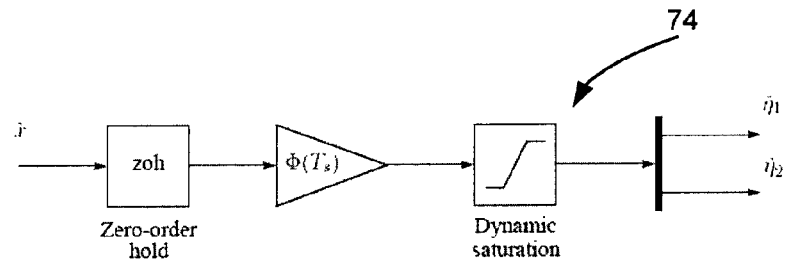
Figure 5C:
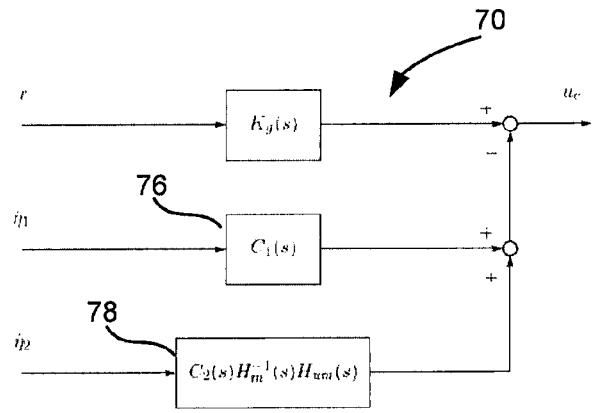

Referring to FIGS. 5A, 5B, and 5C, an embodiment of an $\mathcal{L}_1$ adaptive control architecture is presented in standalone mode with a FES based on piecewise constant adaptive laws.

Referring to FIG. 5A, the following state-predictor 72 is considered:

$$\dot{\hat{x}}(t)=A_m\hat{x}(t)+B_m(u(t)+\hat{\eta}_1(t))+B_{um}\hat{\eta}_2(t)+L\tilde{x}(t), \hat{x}(0)=x_0,$$

where $L \in \mathbb{R}^{n \times n}$ is such that $A_s \triangleq A_m+L$ is a Hurwitz matrix; $x_0$ is the best guess of the initial system state; $\hat{\eta}_1(t)\in \mathbb{R}^m$ and $\hat{\eta}_2(t)\in \mathbb{R}^{n-m}$ are the adaptive estimates; while u(t) is the output of the following nonlinear "actuator" dynamics:

$$\dot{\chi}(t)=f_u(\chi(t),x(t),t,u_c(t),u_c(t-\tau)), \chi(0)=\chi_0$$

$$u(t)=h_u(\chi(t),x(t),t,u_c(t),u_c(t-\tau)).$$

In the above equations, $\chi(t)\in \mathbb{R}^l$ is the "actuator" state, $\tau$ is a time delay design parameter, and $f_u(\bullet)$ and $h_u(\bullet)$ are nonlinear (in some embodiments possibly piecewise-defined) functions. These nonlinear actuator dynamics can be used to incorporate into the design nominal actuator models, dynamic saturation models, known input time delays, etc., as non-limiting examples. In particular, including saturation models is important to ensure stability of the closed-loop system when the actuators saturate.

Referring to FIG. 5B, the adaptive laws 74 for $\hat{\eta}_1(t)$ and $\hat{\eta}_2(t)$ are defined as:

$$\begin{bmatrix} \hat{\eta}_1(t) \\ \hat{\eta}_2(t) \end{bmatrix} = \begin{bmatrix} \mathbb{I}_m & 0 \\ 0 & \mathbb{I}_m \end{bmatrix} \Phi(T_S)\tilde{x}(iT_S), t \in [iT_S, (i+1)T_S),$$

for i=0, 1, 2, ..., where $T_s>0$ is the adaptation sampling time, which can be associated with the sampling rate of the available CPU, and $$\Phi(T_s)=-B^{-1}(A_s^{-1}(e^{A_sT_s}-\mathbb{I}_n))^{-1}e^{A_sT_s}.$$

Referring to FIG. 5C, the control signal of the control law 70 is generated as follows:

$$u_c(s)=K_g(s)r(s)-C_1(s)\hat{\eta}_1(s)-C_2(s)H_m^{-1}(s)H_{um}(s)\hat{\eta}_2(s)$$

where $C_1(s)$ 76 and $C_2(s)$ 78 are m$\times$m strictly-proper and stable bandwidth-limited filters, and $K_g(s)$ is an m$\times$m proper and stable prefilter that can be designed to achieve desired decoupling properties. The transfer matrix $C_2(s)$ must be designed so that $C_2(s)H_m^{-1}(s)H_{um}(s)$ is a proper transfer matrix.

2) Projection-Based Adaptive Laws ($\mathcal{L}_1$S2).

Figure 6A:
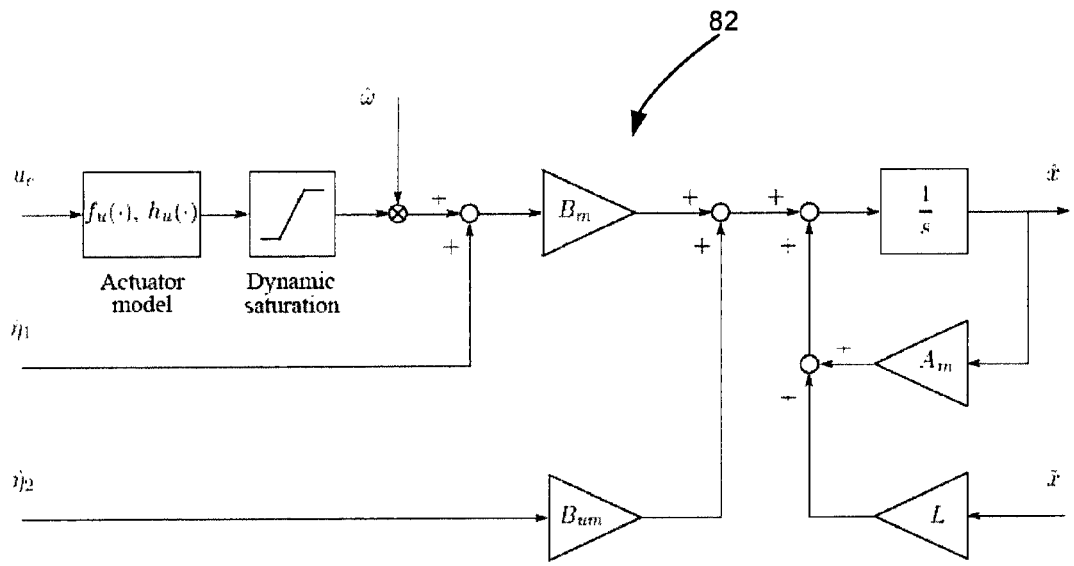
FIGS. 6A, 6B, and 6C show internal structure of the adaptive controller shown in FIG. 1 when used in a standalone mode and with a fast estimation scheme based projection-based adaptive laws.
Figure 6C:
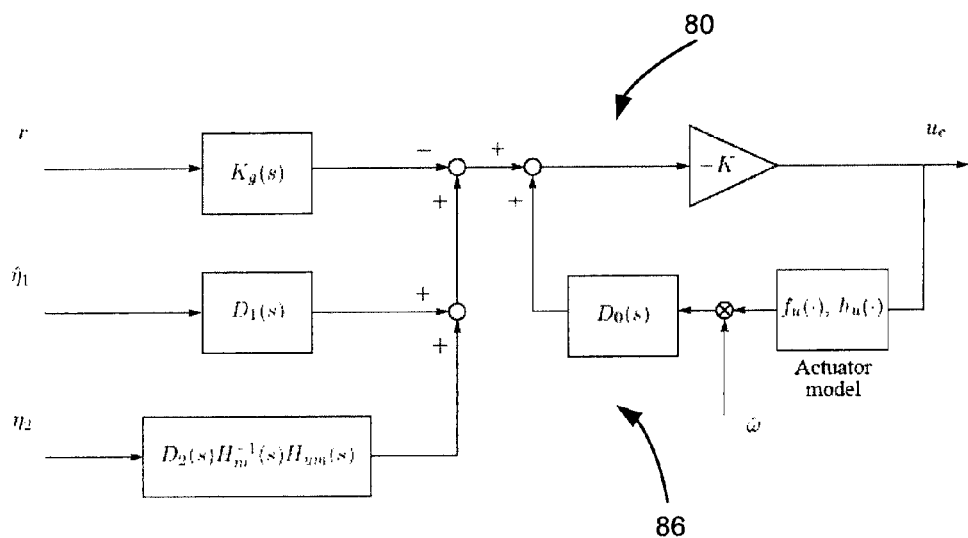
Figure 6B:
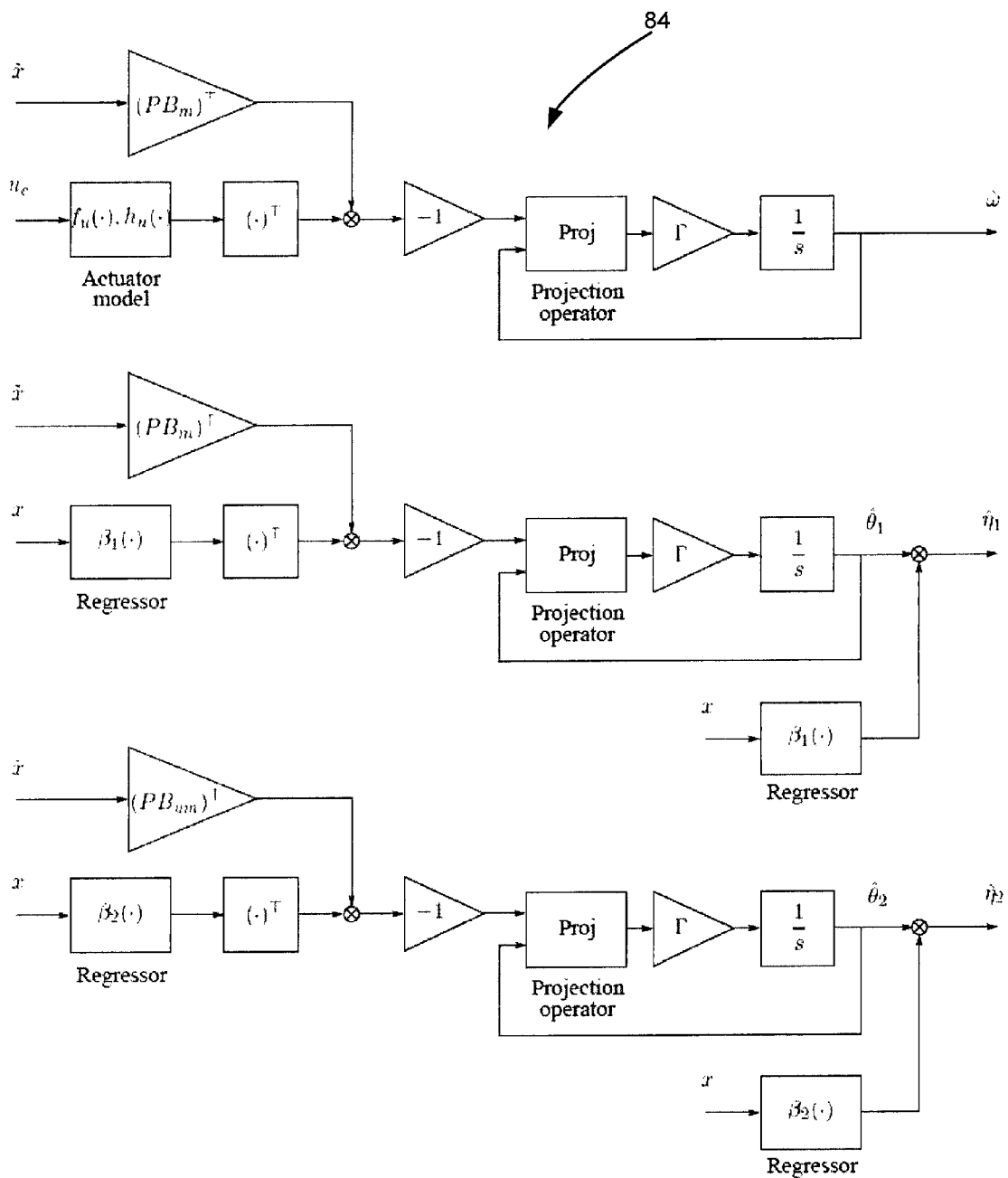

Referring to FIGS. 6A, 6B, and 6C, an embodiment of an $\mathcal{L}_1$ adaptive control architecture is presented in standalone mode with a FES using projection-based adaptive laws.

Referring to FIG. 6A, the following state-predictor 82 is considered:

$$\dot{\hat{x}}(t)=A_m\hat{x}(t)+B_m(\hat{\omega}(t)u(t)+\hat{\theta}_1(t)\beta_1(x(t)))+B_{um}(\hat{\theta}_2(t)\beta_2(x(t)))+L\tilde{x}(t), \hat{x}(0)=x_0$$

where $L\in \mathbb{R}^{n \times n}$ is such that $A_s \triangleq A_m+L$ is a Hurwitz matrix; $x_0$ is the best guess of the initial system state; $\hat{\omega}(t)\in \mathbb{R}^{m \times m}$, $\hat{\theta}_1(t)\in \mathbb{R}^{m \times p_1}$, and $\hat{\theta}_2(t)\in \mathbb{R}^{(n-m) \times p_2}$ are the adaptive estimates; $\beta_1(\bullet)\in \mathbb{R}^{p_1}$ and $\beta_2(\bullet)\in \mathbb{R}^{p_2}$ are the matched and unmatched regressors; while u(t) is the output of the following nonlinear "actuator" dynamics:

$$\dot{\chi}(t)=f_u(\chi(t),x(t),t,u_c(t),u_c(t-\tau)), \chi(0)=\chi_0$$

$$u(t)=h_u(\chi(t),x(t),t,u_c(t),u_c(t-\tau)).$$

In the above equations, $\chi(t)\in \mathbb{R}^l$ is the "actuator" state, $\tau$ is a time delay design parameter, and $f_u(\bullet)$ and $h_u(\bullet)$ are nonlinear (possibly piecewise-defined) functions.

Referring to FIG. 6B, the adaptive laws 84 for $\hat{\omega}(t)$, $\hat{\theta}_1(t)$, and $\hat{\theta}_2(t)$ are defined as:

$$\dot{\hat{\omega}}(t)=\Gamma\text{Proj}(\hat{\omega}(t),-(\tilde{x}^T(t)PB_m)^T u^T(t)), \hat{\omega}(0)=\hat{\omega}_0,$$

$$\dot{\hat{\theta}}_1(t)=\Gamma\text{Proj}(\hat{\theta}_1(t),-(\tilde{x}^T(t)PB_m)^T \beta_1^T(x(t))), \hat{\theta}_1(0)=\hat{\theta}_{10},$$

$$\dot{\hat{\theta}}_2(t)=\Gamma\text{Proj}(\hat{\theta}_2(t),-(\tilde{x}^T(t)PB_{um})^T \beta_2^T(x(t))), \hat{\theta}_2(0)=\hat{\theta}_{20},$$

where $\Gamma\in \mathbb{R}^+$ is the adaptation gain; $P=P^T>0$ is the solution to the algebraic Lyapunov equation $A_s^T P+PA_s=-Q$, $Q=Q^T>0$; and Proj($\bullet,\bullet$) denotes the projection operator.

The projection operator can be defined as follows:

Let $\theta$ be an unknown parameter, and assume that it belongs to the convex compact set $\Theta$. Then, the projection operator Proj($\bullet,\bullet$) is given by:

$$Proj(\hat{\theta}, x) = \begin{cases} x & \text{if } h(\hat{\theta}) < 0 \\ x & \text{if } h(\hat{\theta}) > 0, \nabla h^\top x \leq 0 \\ x - \dfrac{\nabla h \nabla h^\top yh(\hat{\theta})}{\|\nabla h\|^2} & \text{if } h(\hat{\theta}) > 0, \nabla h^\top x > 0 \end{cases}$$

where $h(\hat{\theta}) = \dfrac{\hat{\theta}^\top \hat{\theta} - \theta_{max}^2}{\epsilon_\theta \theta_{max}}$, with $\theta_{max} \in \mathbb{R}^+$ being the norm bound imposed on $\hat{\theta}$, and $\epsilon_\theta \in \mathbb{R}^+$ being the convergence tolerance of the bound. By appropriately choosing $\theta_{max}$ and $\epsilon_\theta$ the Proj operator ensures that $\hat{\theta}(t) \in \Theta$ for all $t \geq 0$. The following property of the projection operator is used in the corresponding Lyapunov analysis.

Lemma: given $x, \hat{\theta} \in \mathbb{R}^n$, we have:

$$(\hat{\theta}-\theta)^T(\text{Proj}(\hat{\theta},x)-x) \leq 0, \text{ where } \theta \text{ is the true value of } \hat{\theta}.$$

Referring to FIG. 6C, the control signal of the control law 80 is the output of the feedback structure and is generated as follows:

$$u_c(s) = -K(D_0(s)\hat{\mu}(s) + D_1(s)\hat{\eta}_1(s) + D_2(s)H_m^{-1}(s)H_{um}(s)\hat{\eta}_2(s) - K_g(s)r(s))$$

where $K \in \mathbb{R}^{m \times m}$ is a matrix gain, $\hat{\mu}(s)$, $\hat{\eta}_1(s)$, and $\hat{\eta}_2(s)$ are the Laplace transforms of the signals $\hat{\mu}(t) = \hat{\omega}(t)u(t)$, $\hat{\eta}_1(t) = \hat{\theta}_1(t)\beta_1(x(t))$, and $\hat{\eta}_2(t) = \hat{\theta}_2(t)\beta_2(x(t))$, $D_0(s)$, $D_1(s)$ and $D_2(s)$ are $m \times m$ proper transfer matrices, and $K_g(s)$ is an $m \times m$ proper prefilter that can be designed to achieve desired decoupling properties. The transfer matrix $D_2(s)$ must be designed so that $D_2(s)H_m^{-1}(s)H_{um}(s)$ is a proper transfer matrix. In embodiments of this architecture, the bandwidth-limited filter 86 may be constructed using a feedback structure in the control law and is characterized by the matrix gain $K$ and the transfer matrices $D_0(s)$, $D_1(s)$ and $D_2(s)$ (see C. REMARKS).

B. Augmentation Mode

1) Piecewise Constant Adaptive Laws ($\mathcal{L}_1$A1).

Figure 7A:
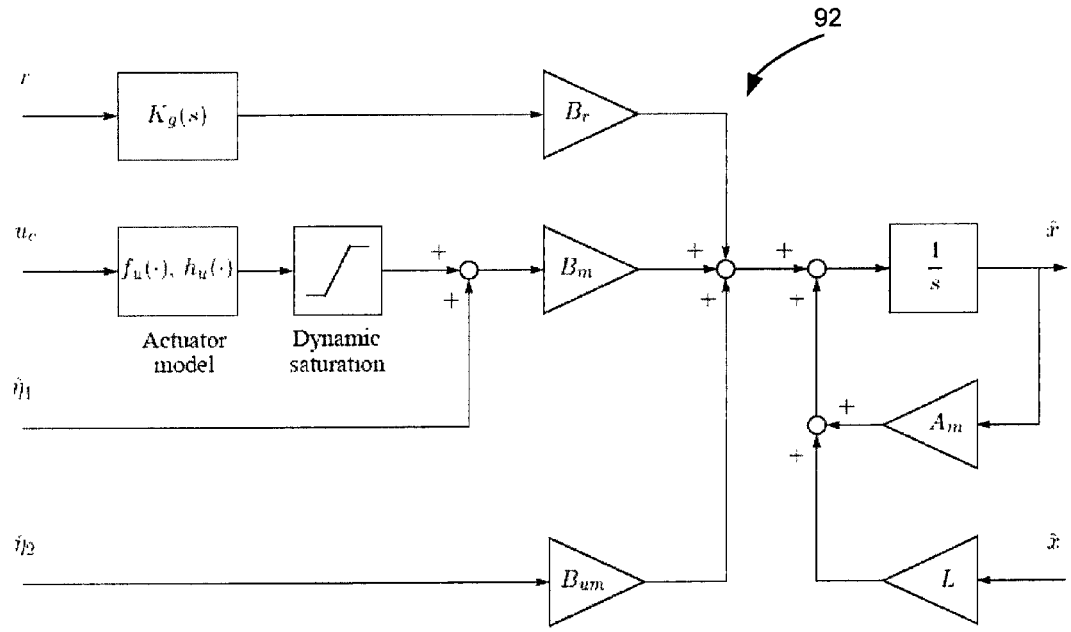
FIGS. 7A, 7B, and 7C show internal structure of the adaptive controller shown in FIG. 2 when used in an augmentation mode and with a fast estimation scheme based on piecewise constant adaptive laws.
Figure 7B:
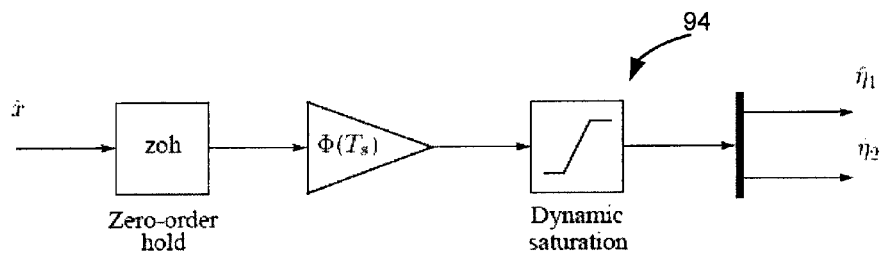
Figure 7C:
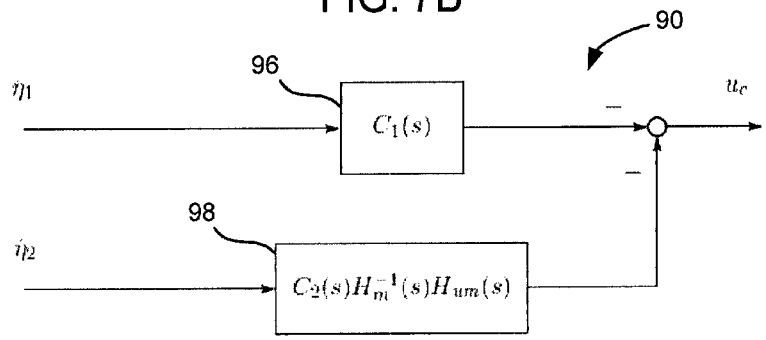

Referring to FIGS. 7A, 7B, and 7C, an embodiment of an $\mathcal{L}_1$ adaptive architecture is presented in augmentation mode with a FES based on piecewise constant adaptive laws.

Referring to FIG. 7A, the following state-predictor 92 is considered:

$$\dot{\hat{x}}(t) = A_m\hat{x}(t) + B_r r_g(t) + B_m(u(t) + \hat{\eta}_1(t) + B_{um}\hat{\eta}_2(t) + L\tilde{x}(t), \hat{x}(0) = x_0,$$

where $B_r \in \mathbb{R}^{n \times m}$ is the command control matrix (obtained from closing the loop with the baseline tracking controller); $r_g(t)$ is the signal with Laplace transform $r_g(s) = K_g(s)r(s)$, with $K_g(s)$ being an $m \times m$ proper and stable prefilter that can be designed to achieve desired decoupling properties; $L \in \mathbb{R}^{n \times n}$ is such that $A_s \triangleq A_m + L$ is a Hurwitz matrix; $x_0$ is the best guess of the initial system state; $\hat{\eta}_1(t) \in \mathbb{R}^m$ and $\hat{\eta}_2(t) \in \mathbb{R}^{n-m}$ are the adaptive estimates; while $u(t)$ is again the output of the following nonlinear "actuator" dynamics:

$$\dot{\chi}(t) = f_u(\chi(t), x(t), t, u_c(t), u_c(t-\tau)), \chi(0) = \chi_0$$

$$u(t) = h_u(\chi(t), x(t), t, u_c(t), u_c(t-\tau)).$$

In the above equations, $\chi(t) \in \mathbb{R}^l$ is the "actuator" state, $\tau$ is a time delay design parameter, and $f_u(\bullet)$ and $h_u(\bullet)$ are nonlinear (possibly piecewise-defined) functions.

Referring to FIG. 7B, the adaptive laws 94 for $\hat{\eta}_1(t)$ and $\hat{\eta}_2(t)$) are defined as:

$$\begin{bmatrix} \eta_1(t) \\ \eta_2(t) \end{bmatrix} = \begin{bmatrix} \mathbb{I}_m & 0 \\ 0 & \mathbb{I}_{n-m} \end{bmatrix} \Phi(T_S)\tilde{x}(iT_S), t \in [iT_S, (i+1)T_S),$$

for $i = 0, 1, 2, \ldots$, where $T_s > 0$ is the adaptation sampling time, which can be associated with the sampling rate of the available CPU, and $$\Phi(T_s) = -B^{-1}(A_s^{-1}(e^{A_sT_s} - \mathbb{I}_n))^{-1}e^{A_sT_s}$$

Referring to FIG. 7C, the control signal of the control law 90 is generated as follows:

$$u_c(s) = -C_1(s)\hat{\eta}_1(s) - C_2(s)H_m^{-1}(s)H_{um}(s)\hat{\eta}_2(s)$$

where $C_1(s)$ 96 and $C_2(s)$ 98 are $m \times m$ strictly-proper and stable bandwidth-limited filters. The transfer matrix $C_2(s)$ must be designed so that $C_2(s)H_m^{-1}(s)H_{um}(s)$ is a proper transfer matrix.

2) Projection-Based Adaptive Laws ($\mathcal{L}_1$A2)

Figure 8A:
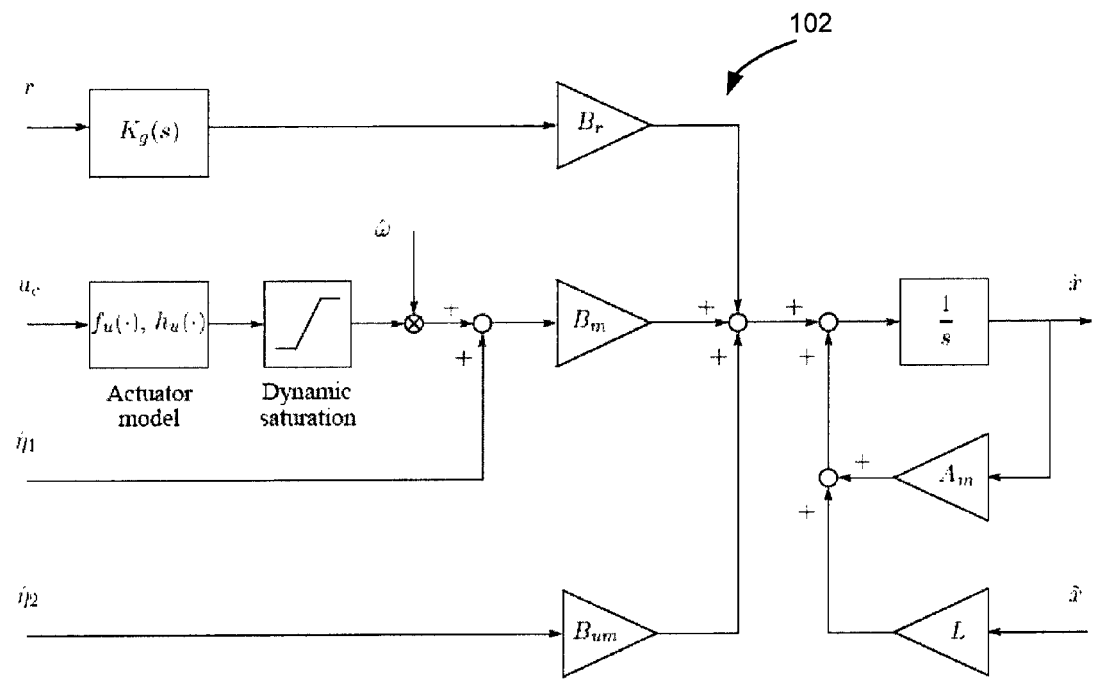
FIGS. 8A, 8B, and 8C show internal structure of the adaptive controller shown in FIG. 2 when used in an augmentation mode and with a fast estimation scheme based projection-based adaptive laws.
Figure 8C:
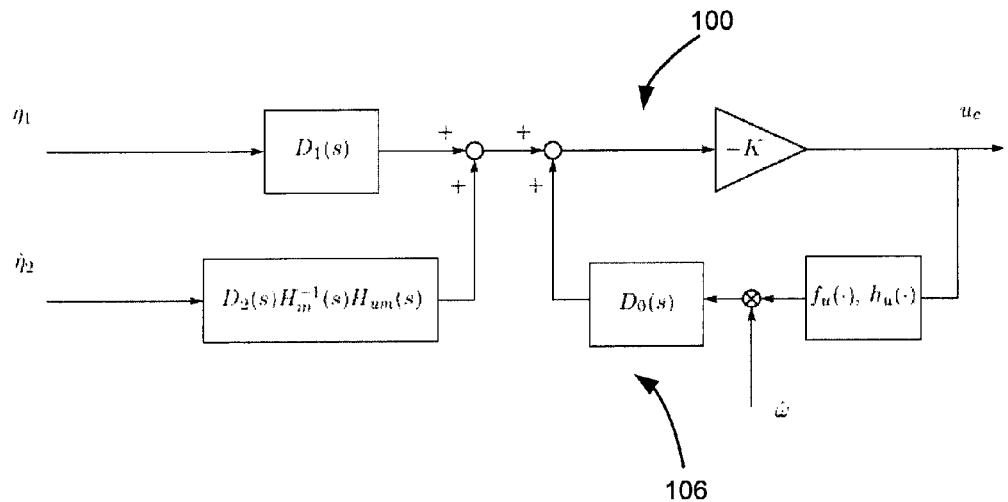
Figure 8B:
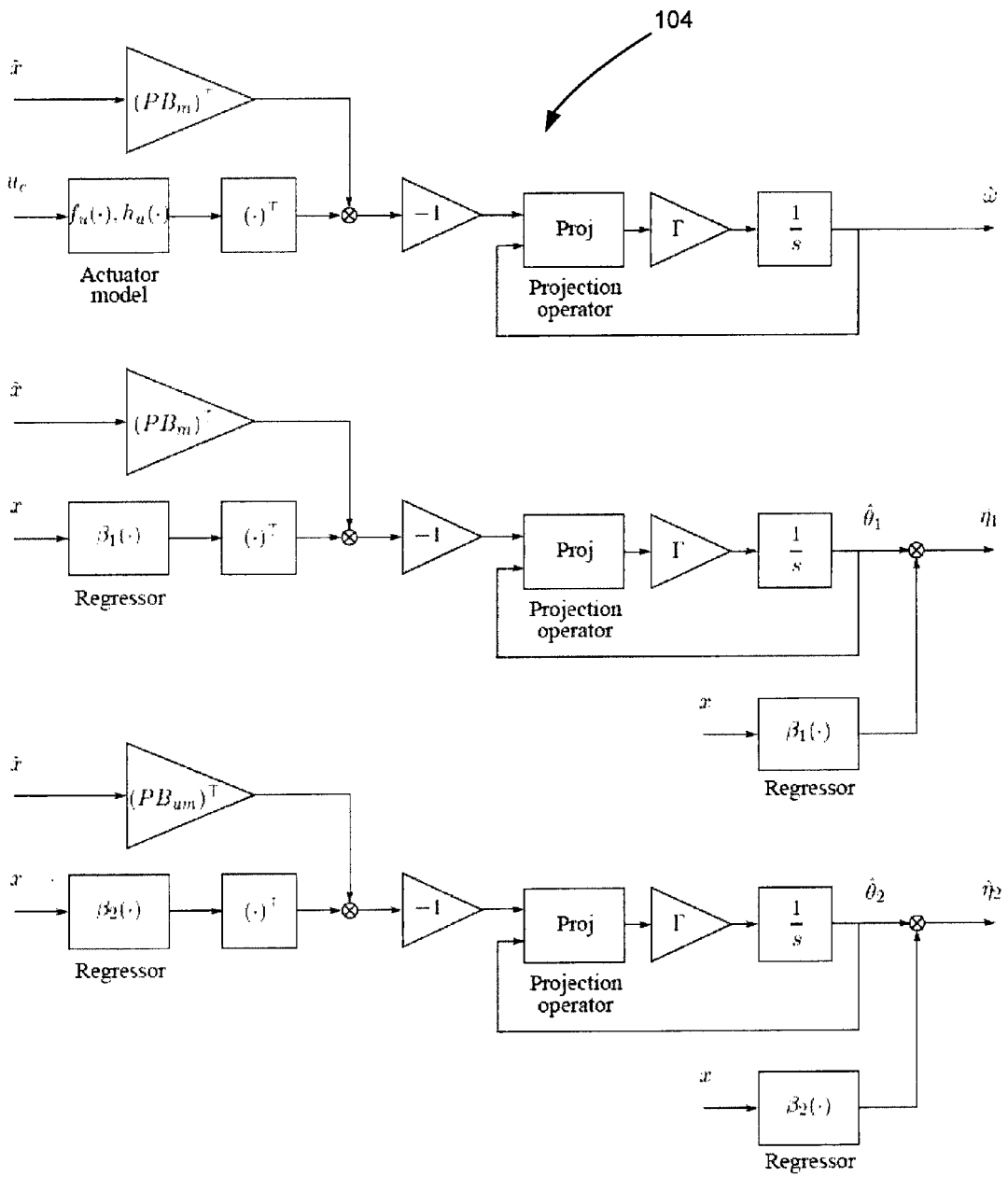

Referring to FIGS. 8A, 8B, and 8C, an embodiment of an $\mathcal{L}_1$ adaptive control architecture is presented in augmentation mode with a FES using projection-based adaptive laws.

Referring to FIG. 8A, the following state-predictor 102 is considered:

$$\dot{\hat{x}} = A_m\hat{x}(t) + B_r r_g(t) + B_m(\hat{\omega}(t)u(t) + \hat{\theta}_1(t)\beta_1(x(t)) + B_{um}(\hat{\theta}_2(t))\beta_2(x(t))) + L\tilde{x}(t), \hat{x}(0) = x_0,$$

where $B_r \in \mathbb{R}^{n \times m}$ is the command control matrix (obtained from closing the loop with the baseline tracking controller); $r_g(t)$ is the signal with Laplace transform $r_g(s) = K_g(s)r(s)$, with $K_g(s)$ being an $m \times m$ proper and stable prefilter that can be designed to achieve desired decoupling properties; $L \in \mathbb{R}^{n \times n}$ is such that $A_s \triangleq A_m + L$ is a Hurwitz matrix; $x_0$ is the best guess of the initial system state; $\hat{\omega}(t) \in \mathbb{R}^{m \times m}$, $\hat{\theta}_1 \in \mathbb{R}^{m \times p_1}$, and $\hat{\theta}_2(t) \in \mathbb{R}^{(n-m) \times p_2}$ are the adaptive estimates; $\beta_1(\bullet) \in \mathbb{R}^{p_1}$ and $\beta_2(\bullet) \in \mathbb{R}^{p_2}$ are matched and unmatched regressors; while $u(t)$ is the output of the following nonlinear "actuator" dynamics:

$$\dot{\chi}(t) = f_u(\chi(t), x(t), t, u_c(t), u_c(t-\tau)), \chi(0) = \chi_0$$

$$u(t) = h_u(\chi(t), x(t), t, u_c(t), u_c(t-\tau)).$$

In the above equations, $\chi(t) \in \mathbb{R}^l$ is the "actuator" state, $\tau$ is a time delay design parameter, and $f_u(\bullet)$ and $h_u(\bullet)$ are nonlinear (possibly piecewise-defined) functions.

Referring to FIG. 8B, the adaptive laws 104 for $\hat{\omega}(t), \hat{\theta}_1(t)$, and $\hat{\theta}_2(t)$ are defined as:

$$\dot{\hat{\omega}} = \Gamma \text{Proj}(\hat{\omega}(t), -(\tilde{x}^T(t)PB_m)^T u^T(t))\hat{\omega}(0) = \hat{\omega}_0,$$

$$\dot{\hat{\theta}}_1(t) = \Gamma \text{Proj}(\hat{\theta}_1(t), -(\tilde{x}^T(t)PB_m)^T \beta_1^T(x(t)))\hat{\theta}_1(0) = \hat{\theta}_{1_0},$$

$$\dot{\hat{\theta}}_2(t) = \Gamma \text{Proj}(\hat{\theta}_2(t), -(\tilde{x}^T(t)PB_m)^T \beta_2^T(x(t)))\hat{\theta}_2(0) = \hat{\theta}_{2_0},$$

where $\Gamma \in \mathbb{R}^+$ is the adaptation gain; $P = P^T > 0$ is the solution to the algebraic Lyapunov equation $A_s^T P + PA_s = -Q$, $Q = Q^T > 0$; and $\text{Proj}(\bullet, \bullet)$ denotes the projection operator.

As previously described, the projection operator can be defined as follows:

Let $\theta$ be an unknown parameter, and assume that it belongs to the convex compact set $\Theta$. Then, the projection operator $\text{Proj}(\bullet, \bullet)$ is given by:

$$Proj(\hat{\theta}, x) = \begin{cases} x & \text{if } h(\hat{\theta}) < 0 \\ x & \text{if } h(\hat{\theta}) > 0, \nabla h^\top x \leq 0 \\ x - \dfrac{h^\top yh(\hat{\theta})}{\|\nabla h\|^2} & \text{if } h(\hat{\theta}) > 0, \nabla h^\top x > 0 \end{cases}$$

-continued where $h(\hat{\theta}) = \frac{\hat{\theta}^\top \hat{\theta} - \theta_{max}^2}{\epsilon_{\theta^\theta}\max}$, with $\theta_{max} \in \mathbb{R}^+$ being the norm bound imposed on $\hat{\theta}$, and $\epsilon_\theta \in \mathbb{R}^+$ being the convergence tolerance of the bound. By appropriately choosing $\theta_{max}$ and $\epsilon_\theta$ the Proj operator ensures that $\hat{\theta}(t) \in \Theta$ for all $t \geq 0$. The following property of the projection operator is used in the corresponding Lyapunov analysis.

Lemma, given x, $\hat{\theta} \in \mathbb{R}^n$, we have:

$(\hat{\theta}-\theta)^T(\text{Proj}(\hat{\theta},x)-x) \leq 0$, where $\theta$ is the true value of $\hat{\theta}$.

Referring to FIG. 8C, the control signal of the control law 100 is the output of the feedback structure and is generated as follows:

$u_c(s) = K(D_0(s)\hat{\mu}(s) + D_1(s)\hat{\eta}_1(s) + D_2(s)H_m^{-1}(s)H_{um}(s)\hat{\eta}_2(s))$ where $K \in \mathbb{R}^{m \times m}$ is a matrix gain, $\hat{\mu}(s), \hat{\eta}_1(s),$ and $\hat{\eta}_2(s)$ are the Laplace transforms of the signals $\mu(t) = \omega(t)u(t), \hat{\eta}_1(t) = \hat{\theta}_1(t)\beta_1(x)(t)$, and $\hat{\eta}_2 = \hat{\theta}_2(t)\beta_2(x)(t)), D_0(s), D_1(s),$ and $D_2(s)$ are m×m proper transfer matrices, and $K_g(s)$ is an m×m proper prefilter that can be designed to achieve desired decoupling properties. The transfer matrix $D_2(s)$ must be designed so that $D_2(s)H_m^{-1}(s)H_{um}(s)$ is a proper transfer matrix. In embodiments of this architecture, the bandwidth-limited filter 106 may be constructed using a feedback structure in the control law and is characterized by the matrix gain K and the transfer matrices $D_0(s), D_1(s)$ and $D_2(s)$ (see below).

C. Remarks

1) Construction of the bandwidth-limited filter 86, 106 in projection-based FES.

When there is explicit adaptation on the input gain of the plant (see algorithms for $\mathbb{R}_1 S2$ and $\mathbb{R}_1 A2$ above), the bandwidth-limited filter is preferably constructed using a feedback structure in the control law. Next it is shown how this filtering process takes place in the algorithm $\mathbb{R}_1 S2$ for the case of a nominal linear actuator model. Similar manipulations lead to the same filter structure for the algorithm $\mathbb{R}_1 A2$.

Let $\omega_0$ be the actual input gain of the system to be controlled. Then, we can define the signal $\hat{\eta}(t)$ as:

$\hat{\eta}(t) = \omega_0 u(t) + (\hat{\omega}(t) - \omega_0)u(t) + \hat{\eta}_1(t) + \hat{\eta}_{2m}(t) - r_g(t),$ where $\hat{\eta}_{2m}(t)$ is the signal with Laplace transform $\hat{\eta}_{2m}(s) = H_m^{-1}(s)H_{um}(s)\hat{\eta}_2(s)$.

For the case of a linear actuator model $W_{act}(s)$, we have that $u(s) = W_{act}(s) u_c(s)$, and therefore:

$\hat{\eta}(s) = \omega_0 W_{act}(s) u_c(s) + u_{\tilde{\omega}}(s) + \hat{\eta}_1(s) + \hat{\eta}_{2m}(s) - r_g(s)$ $= -\omega_0 W_{act}(s) KD(s)\hat{\eta}(s) + u_{\tilde{\omega}}(s) + \hat{\eta}_1(s) + \hat{\eta}_{2m}(s) - r_g(s),$ where we have taken $D(s) = D_0(s) = D_1(s) = D_2(s)$ and $u_{\tilde{\omega}}(s)$ is the Laplace transform of the signal $u_{\tilde{\omega}}(t) = (\hat{\omega}(t) - \omega_0)u(t)$. Isolating $\hat{\eta}(s)$ in the above expression yields:

$\hat{\eta}(s) = [\mathbb{1}_m + \omega_0 W_{act}(s)KD(s)]^{-1}(u_{\tilde{\omega}}(s) + \hat{\eta}_1(s) + \hat{\eta}_{2m}(s) - r_g(s)),$ which implies that:

$u_c(s) = -KD(s)[\mathbb{1}_m + \omega_0 W_{act}(s)KD(s)]^{-1}u_{\tilde{\omega}}(s) + \hat{\eta}_1(s) + \hat{\eta}_{2m}(s) - r_g(s)).$ This control signal $u_c(t)$ is sent to the plant 62, which has input gain $\omega_0$ and actuator $W_{act}(s)$, resulting in the effective control effort:

$\omega_0 W_{act}(s) u_c(s) = -\omega_0 W_{act}(s)KD(s)[\mathbb{1}_m + \omega_0 W_{act}(s)KD(s)]^{-1}(u_{\tilde{\omega}}(s) + \hat{\eta}_1(s) + \hat{\eta}_{2m}(s) - r_g(s)).$ The design elements K and D (s) in the control law of the $\mathcal{L}_1$ adaptive control architecture can be chosen to assure that the filtering structure $C(s) = \omega_0 W_{act}(s)KD(s)[\mathbb{1}_m + \omega_0 W_{act}(s)KD(s)]^{-1}$ is strictly proper and stable, and has a limited bandwidth, for all admissible plant input gains $\omega_0$ and admissible actuators $W_{act}(s)$.

2) Control Architecture Monitoring.

The error signal $\tilde{x}(t)$ can be used for monitoring and supervision of the correct implementation of the $\mathcal{L}_1$ adaptive controller. For proper operation, the amplitude of the components of this error signal is desirably several orders of magnitude smaller that the amplitude of the corresponding components of the actual system state. Moreover, the amplitude of this error signal should decrease as the adaptation rate of the FES increases. To be more precise, fulfillment of these requirements would indicate proper design and implementation of the adaptive laws of the $\mathcal{L}_1$ adaptive controller, and would restrict the search of possible implementation errors to the state-predictor and control law blocks.

3) Adding Damping to Adaptation.

The optional term $L\tilde{x}(t)$ in the state-predictor of the $\mathcal{L}_1$ adaptive control architecture is meant to add damping to the adaptation process. This optional element, if properly designed, has the ability to damp down the high-frequency oscillations present in the signals of the adaptation loop, and might also increase the robustness margins of the closed-loop adaptive system. This additional damping, however, spoils the adaptation process, and thus leads to reduced performance.

4) Unmatched Uncertainties.

Embodiments of the $\mathcal{L}_1$ adaptive control architectures presented above include estimation and compensation for general unmatched uncertainties. If the plant to be controlled is free from this kind of uncertainties, or compensation for their undesirable effects is not required or needed, adaptation to the unmatched component of the uncertainties can be disabled in the control algorithm, both in the FES 50 and in the CL 60. Also, additional embodiments of the $\mathcal{L}_1$ adaptive control architectures can be developed for uncertain plants that can be represented in strict-feedback form, semi-strict-feedback form, pure-feedback form, or block-strict-feedback form.

5) Architecture Modifications.

Embodiments of the $\mathcal{L}_1$ adaptive control architectures presented above admit several modifications and extensions. For example, a filtering unit can be added at the input of the controller for conditioning the feedback signals, or control allocation schemes can be implemented for distributing a desired total control effort among a redundant set of control effectors. Also, the matrices $A_m, B_m, B_{um},$ and $B_r$ may be time-varying (gain-scheduled) to accommodate a priori knowledge of the plant dynamics or different performance specifications at different operating conditions.

6) Combined Standalone-Augmentation Adaptive Architecture.

Embodiments of the $\mathcal{L}_1$ adaptive control architectures presented above are developed to be implemented either in standalone mode or as an augmentation of a baseline tracking controller 66. It is possible, nevertheless, to combine both approaches and implement an $\mathcal{L}_1$ adaptive controller augmenting a baseline controller that provides tracking capabilities only for some of the channels.

7) Connection to MRAC Architectures.

In the absence of adaptation on the system input gain and compensation for unmatched uncertainties, the $\mathcal{L}_1$ adaptive control architecture may reduce to a conventional state-predictor based adaptive scheme, which can be similar to a direct MRAC architecture, with an additional bandwidth-limited filter 30 inserted in the control path. The presence of this bandwidth-limited filter is important to develop adaptive control schemes providing desired uniform transient performance with assured robustness margins.

In fact, in the absence of this filter (e.g., a pure MRAC architecture), adaptation interacts with performance and robustness, which implies that the standard, well-known trade-off between performance and robustness in control system design becomes a "three-party" trade-off between adaptation, performance, and robustness. Increasing the speed of adaptation leads to loss of robustness, whereas slow adaptation leads to lack of transient characterization with respect to the change in reference inputs, initial conditions, uncertainties, etc. Due to this inherent limitation of conventional adaptive control architectures and despite the vast improvements in adaptive control design methods and adaptation laws observed during the years, adaptive control has largely remained as a tool for adapting only to slowly varying uncertainties. Moreover, the lack of guidelines to solve the trade-off between adaptation, performance, and robustness makes the design of conventional adaptive controllers an overly challenging problem.

The insertion of the bandwidth-limited filter configuration 30 overcomes these difficulties. As explained earlier, it leads to separation of adaptation from robustness, which enables the use of fast estimation schemes in adaptive control, and the application of systematic design procedures that significantly reduce the tuning effort required to achieve desired closed-loop performance, particularly while operating in the presence of uncertainties and failures.

The novel $\mathcal{L}_1$ adaptive control systems and methods are quickly and easily transferable to new platforms, regardless of differences in body structure or maximum ability. The need for gain-scheduling is eliminated through the use of fast estimation schemes in combination with bandwidth-limited (low-pass) filtering in the control channel, which attenuates the high frequencies typically appearing due to fast adaptation.

The novel $\mathcal{L}_1$ adaptive control architecture described above provides assured performance and robustness in the presence of fast adaptation. Performance limitations are only limited by hardware limitations. This novel architecture extends the prior architecture of $\mathcal{L}_1$ adaptive control theory to general nonlinear multi-input multi-output systems in the presence of significant unknown unmatched uncertainties. The architecture relies on separation of adaptation from robustness, which allows for increasing the rate of adaptation, subject only to CPU limitations, while in the meantime maintaining assured robustness margins.

Prior architectures of adaptive control did not exhibit these features. Namely, the prior architectures tend to lose robustness in the presence of fast adaptation. Thus, they require more tuning and gain-scheduling, which defeats the point of adaptation.

As compared to prior architectures, the novel $\mathcal{L}_1$ adaptive control architecture can be applied to multi-input and multi-output nonlinear systems in the presence of unmatched uncertainties. These features of the $\mathcal{L}_1$ adaptive control architecture have been demonstrated on a variety of flight models, and may be configured to control different flight models without redesign or retuning for various flight conditions and yields uniform scaled response, dependent upon changes in initial conditions, system uncertainties, and various reference inputs. This particular feature can significantly reduce the control design costs for industry and simplify their verification and validation process. Prior architectures were not meant for controlling general multi-input multi-output systems in the presence of unknown unmatched dynamics. From the application stand-point, this allows for extending the flight regimes up to high-angles of attack, including stall, without resorting to gain-scheduling and without the need of retuning.

It is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

Those skilled in the art will appreciate that the embodiments disclosed herein may be used in accordance with other estimation schemes. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of adaptive control for an uncertain nonlinear multi-input multi-output system, the method comprising:
    providing a processor operable to execute a control law residing in a memory, the control law including a bandwidth-limited filter configuration, the control law configured to generate a control signal $u_c$ as an output of the bandwidth-limited filter configuration;
    measuring a system state signal x;
    generating a prediction of the system state $\hat{x}$;
    subtracting the prediction of the system state $\hat{x}$ from the measured system state signal x, and producing an error signal $\tilde{x}$;
    generating estimates of uncertainties in the multi-input multi-output system; and
    generating the control signal $u_c$ as an output of the bandwidth-limited filter configuration based on the generated estimates of uncertainties and the measured system state x.

2. The method according to claim 1 further including generating the estimates of uncertainties based on the measured system state signal x and the control signal $u_c$.

3. The method according to claim 1 further including providing a state-predictor configured for mimicking the multi-input multi-output system and for specifying desired system behavior.

4. The method according to claim 1 further including updating the estimates of the uncertainties at a high adaptation rate.

5. The method according to claim 1 wherein the adaptive control system is a closed-loop system.

6. The method according to claim 1 wherein the multi-input multi-output system is in the presence of significant unmatched uncertainty.

7. The method according to claim 1 wherein the bandwidth-limited filter configuration comprises m×m strictly-proper and stable bandwidth-limited filters, wherein m system outputs and m control signals are included in the m×m strictly-proper and stable bandwidth-limited filters.

8. An adaptive control system for controlling a nonlinear multi-input multi-output system with uncertainties, the adaptive control system comprising:
   a fast estimation scheme, the fast estimation scheme including a state predictor and an adaptive law, the fast estimation scheme configured to generate estimates of the uncertainties in the multi-input multi-output system; and
   a control law, the control law including a bandwidth-limited filter configuration, the control law configured to generate a control signal $u_c$ as an output of the bandwidth-limited filter configuration.

9. The system according to claim 8 wherein the estimates of the uncertainties are generated based on a measured system state x and the control signal $u_c$.

10. The system according to claim 8 wherein the state-predictor is configured to mimic the multi-input multi-output system and to specify desired system behavior.

11. The system according to claim 9 wherein the state-predictor is configured to generate a prediction of the system state $\hat{x}$, the prediction of the system state $\hat{x}$ then being subtracted from the measured system state x, to produce an error signal $\tilde{x}$; and
   the error signal $\tilde{x}$ together with the measured system state signal x and the control signal $u_c$, drives the adaptive process.

12. The system according to claim 9 wherein the control law generates the control signal $u_c$ based on the estimates of uncertainties and the measured system state x.

13. The system according to claim 8 wherein the adaptive law is configured to update the estimates of the uncertainties at a high adaptation rate.

14. The system according to claim 8 wherein the adaptive control system is a closed-loop system.

15. The system according to claim 8 wherein the multi-input multi-output system is in the presence of significant unmatched uncertainty.

16. An adaptive control system comprising:
   a processor operable to execute a control law residing in a memory, the control law including a bandwidth-limited filter configuration, the control law configured to generate a control signal $u_c$ as an output of the bandwidth-limited filter configuration; and
   a state predictor configured to generate a prediction of a nonlinear multi-input multi-output system state $\hat{x}$, such that when the system state $\hat{x}$ is subtracted from an actual system state x, an error signal is produced that, together with the actual system state x and the control signal $u_c$, drives an adaptation process.

17. The system according to claim 16 wherein the bandwidth-limited filter comprises a feedback structure in the control law.

18. The system according to claim 16 wherein the control signal $u_c$ equals $K_g(s)r(s) - C_1(s)\hat{\eta}_1(s) - C_2(s)H_m^{-1}(s)H_{um}(s)\hat{\eta}_2(s)$, wherein
   $K_g(s)$ is a prefilter,
   $r(s)$ is a bounded setpoint,
   $C_1(s)$ and $C_2(s)$ are bandwidth-limited filters,
   $\hat{\eta}_1(s)$ and $\hat{\eta}_2(s)$ are adaptive laws,
   $H_m^{-1}(s)$ is an inverse of a matched transfer matrix, and
   $H_{um}(s)$ is an unmatched transfer matrix.

19. The system according to claim 18 wherein $C_1(s)$ and $C_2(s)$ are stable bandwidth-limited filters.

* * * * *